March 7, 1944. O. H. PIEPER 2,343,620
EQUIPMENT STAND
Filed Oct. 25, 1941 3 Sheets-Sheet 1
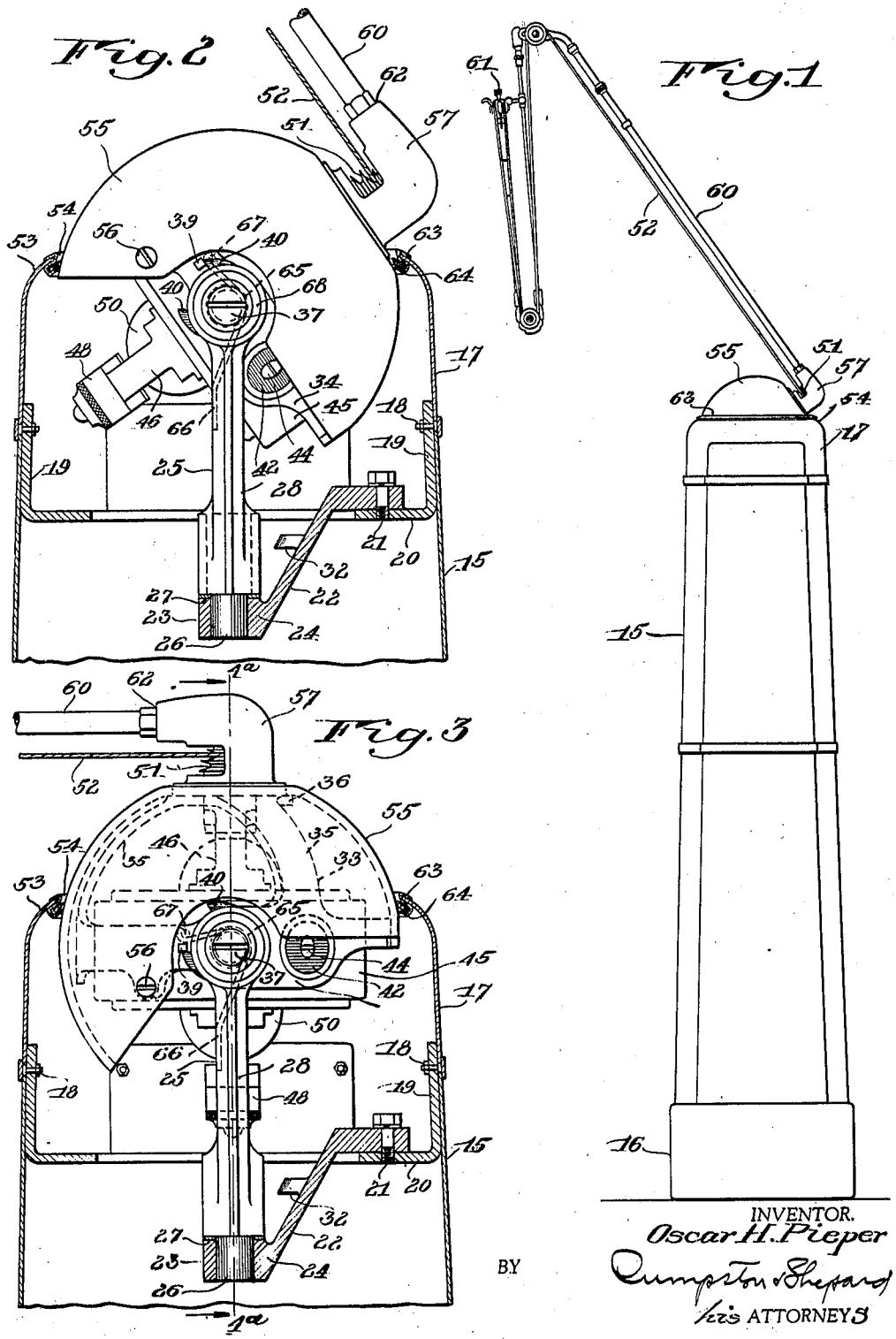
INVENTOR.
Oscar H. Pieper
BY Cumpston & Shepard
his ATTORNEYS March 7, 1944.  O. H. PIEPER  2,343,620
EQUIPMENT STAND
Filed Oct. 25, 1941  3 Sheets-Sheet 2
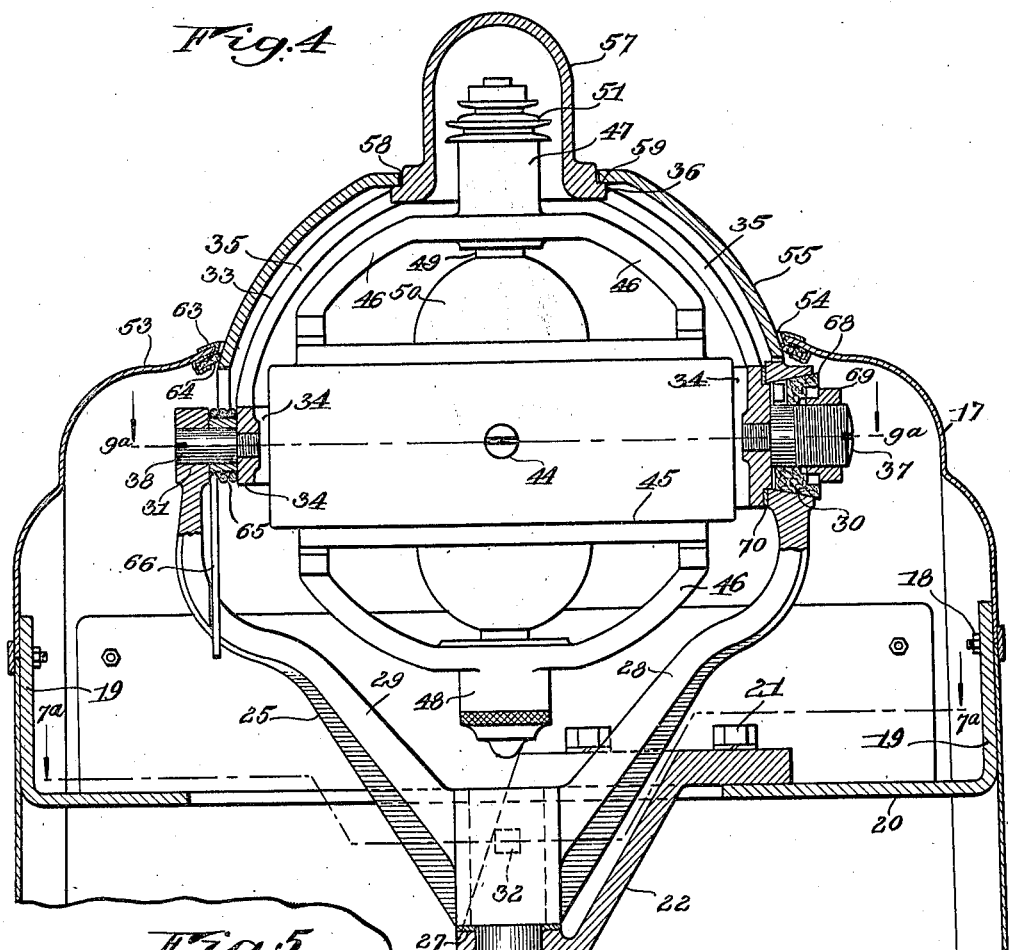
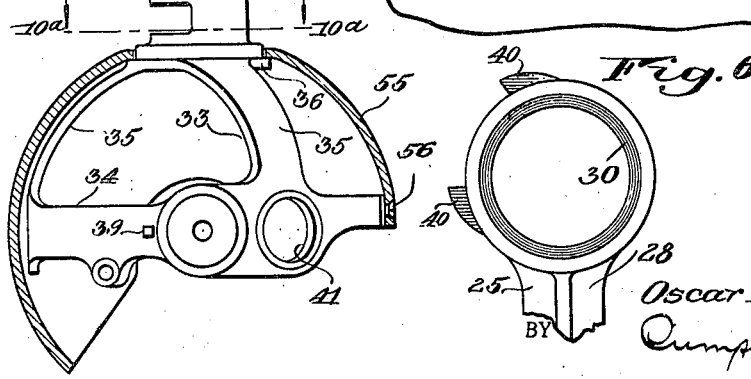
INVENTOR.
Oscar H. Pieper
BY Crumpton & Shepard
his ATTORNEYS March 7, 1944.  O. H. PIEPER  2,343,620

EQUIPMENT STAND

Filed Oct. 25, 1941  3 Sheets-Sheet 3

INVENTOR.
Oscar H. Pieper
BY
Cumpston & Shepard
his ATTORNEYS

Patented Mar. 7, 1944

2,343,620

UNITED STATES PATENT OFFICE 2,343,620

EQUIPMENT STAND

Oscar H. Pieper, Rochester, N. Y.; Rochester Trust and Safe Deposit Company, Rochester, N. Y., a domestic banking corporation of New York, executor of said Oscar H. Pieper, deceased Application October 25, 1941, Serial No. 416,538

10 Claims. (Cl. 32—22)

This invention relates to equipment stands for use in medical work such as the practice of dentistry, for example, and, more particularly, to the combination therewith of motor driven tool equipment, such as the so-called dental engine commonly forming a part of such stands, one object of the invention being to provide a more compact and self-contained construction of the character described, in which the motor portions of the equipment below the tool arm are enclosed and protected to a maximum extent within the hollow housing of the stand.

Another object is to provide a dental engine comprising a tool arm, motor, and supporting bearing means of maximum simplicity and efficiency, so combined with an equipment stand that the motor and its supporting bearing means are located, housed and protected within the walls of the stand in a more compact and self-contained form of construction.

Other objects are to provide an improved construction of the above character in which the convenient flexibility of the tool arm is fully maintained, with a minimum of arm joints, pulleys and like operating parts exposed outside the housing, in a simple, clean-cut and pleasing type of design.

To these and other ends the invention resides in certain improvements and combinations of parts, all as will be hereinafter more fully described, the novel features being pointed out in the claims at the end of the specification.

In the drawings:

Fig. 1 is an elevation of an equipment stand embodying the present invention;

Fig. 2 is an enlarged elevation, partly in section, showing the upper portion of the stand and the associated dental engine with the latter in one of its positions;

Fig. 3 is a similar view with the dental engine in a different position;

Fig. 4 is an enlarged sectional elevation substantially on the line 4a—4a in Fig. 3;

Fig. 5 is an elevation of a supporting frame for the dental engine shown detached with an associated housing part in section;

Fig. 6 is a fragmentary side elevation of one of the arms for supporting the dental engine;

The invention is described in the present instance, by way of illustration, as embodied in a dental equipment stand, although useful applications are contemplated in other fields as well. Dental equipment stands have commonly been constructed with the dental engine supported by an external bracket on the stand, or supported directly on the stand but occupying an objectionable amount of space, as well as being unprotected by any housing and presenting a somewhat unsightly appearance. Equipment stands have also been made in which the motor of the dental engine has been mounted in fixed position inside the housing of the stand with its shaft and pulley projecting outside the housing and with extra arm and pulley means for movably supporting the tool arm and driving its tool. I have found, however, that this problem may be solved in a much improved and more advantageous way by a construction which accomplishes the foregoing objects and which may be embodied in the preferred form hereafter described.

In Fig. 1 there is shown a dental equipment stand indicated generally at 15 of a known or suitable character comprising a hollow frame or housing of generally column shape resting at its base 16 on the floor and presenting within easy reach of the practitioner his various useful items of equipment (not shown), as well understood in the art. In accordance with the present invention the dental engine is mounted for movement as a unit and housed within the upper end of the stand.

Figure 7:
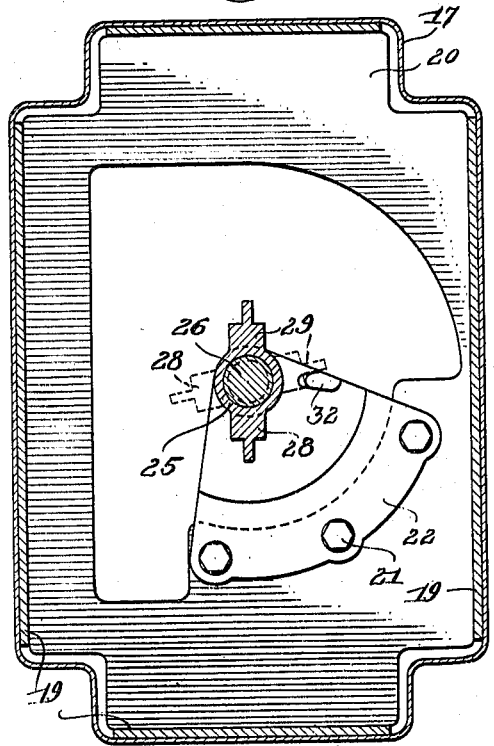
Fig. 7 is a top plan view substantially on the line 7a—7a in Fig. 4.
Figure 8:
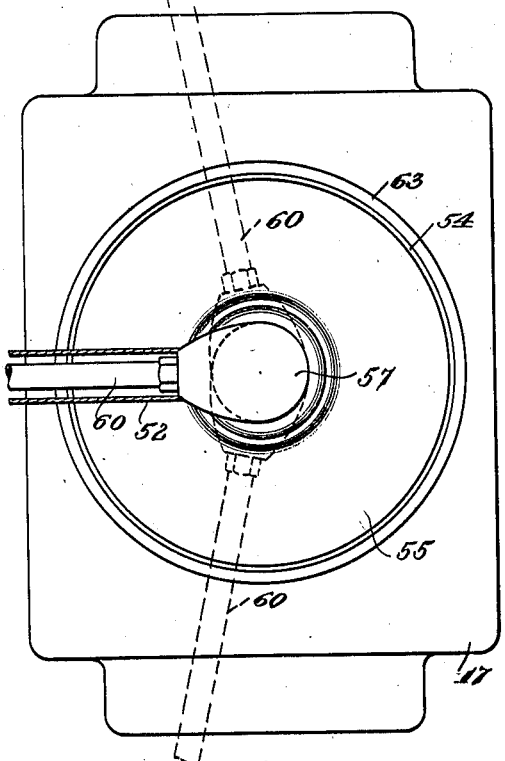
Fig. 8 is a top plan view of the stand with the tool arm indicated in different positions of adjustment.

Referring more particularly to Figs. 2, 3, and 4, the side walls of the stand housing are shown at 17, and secured thereto as by means of bolts 18 are the side flanges 19 of a supporting bed 20 shown also in Fig. 7. Secured to bed plate 20 as by means of bolts 21 is a supporting member 22 carrying a hub 23 in which is formed a vertical bearing 24 for one of the elements by which the dental engine is mounted for a universal type of movement within the housing of the stand.

The means for movably supporting the dental engine preferably comprise an arm means indicated generally at 25 which may be conveniently made in the form of a casting terminating at its lower end in a trunnion 26 mounted for oscillating movement in bearing 24. A bearing washer 27 is preferably inserted between hub 23 and a thrust shoulder on arm means 25 at the upper end of trunnion 26. Arm means 25 comprises upwardly and outwardly extending spaced fork arms 28 and 29 (Fig. 4) the upper ends of which are formed with alined horizontal bearings for receiving the trunnions of a frame in which is mounted the motor of the dental engine, as hereafter described. The bearing of arm 28 is preferably enlarged and tapered as shown at 30 for a purpose hereafter described, while the arm 29 has a cylindrical bearing 31. It is apparent from the above description that arm means 25 is mounted for oscillating movement in the support bearing 24 and support 22 is preferably formed with a projecting lug 32 with which the arms 28 and 29 are arranged to engage so as to limit oscillation of the arm means to substantitally 180°, as indicated in Figure 7.

Figure 10:
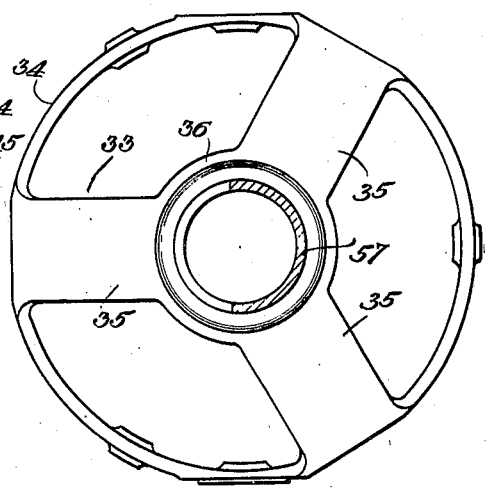
Fig. 10 is a top plan, partly in section, as viewed from the line 10a—10a in Fig. 5.

An additional element is provided for mounting the dental engine motor for oscillation about the horizontal axis of the bearings 30 and 31 of the arm means 25 comprising preferably a frame indicated generally at 33 (Figs. 4, 5, and 10). This frame may be conveniently manufactured in the form of a casting comprising a motor ring portion 34 encircling the motor field and radial arms 35 which are curved inwardly and upwardly and joined by an annular portion 36 to which further reference will hereafter be made. The motor ring portion 34 of the frame is provided diametrically with trunnions, one at 37 received in bearing 30 of the arm means 25, and the other at 38 which is received in the other bearing 31 of the arm means. The motor frame 33 is thus supported for oscillation about the horizontal axis described, limited in extent by engagement of a lug 39 on the frame with spaced lugs 40 on arm 28 as shown in Figs. 2 and 3, and in detail in Figs. 5 and 6.

Figure 9:
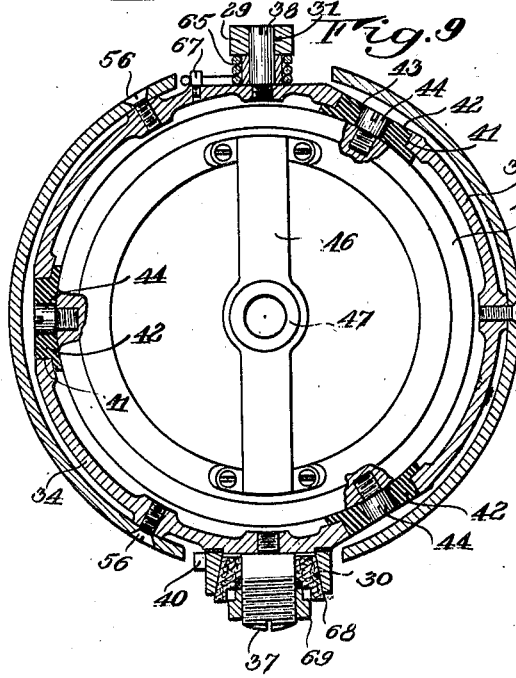
Fig. 9 is a sectional plan view substantially on the line 9a—9a in Fig. 4.

For mounting the dental engine motor in frame 33, the latter preferably has its lower ring portion 34 formed with three openings 41 (Fig. 9) arranged at 120° from one another. In such openings are blocks 42 of rubber or other suitable resilient material which are formed in turn with openings 43, receiving trunnions or bolt heads 44 fixed in the housing 45 of the motor. By this means the motor is mounted in resilient bearings in ring 34 which absorb its operating vibrations. It is apparent from the above description that the dental engine motor is mounted for oscillation about the horizontal axis of the bearings 30 and 31 of arm means 25 and also for oscillation about the vertical axis of bearing 24 of arm means 25, so that it is freely supported for a universal type of movement within the limits described.

The motor housing 45 has fixed thereto the usual arms 46 supporting the upper and lower bearings 47 and 48 for the shaft 49 of the rotor 50. Rotor shaft 49 has fixed thereon beyond its upper bearing 47 a pulley 51 for the usual belt 52 for driving the tool of the motor arm.

It will be noted that the dental engine motor is positioned mainly within the stationary part 17 of the stand housing and below its top wall 53 which has formed therein an opening 54 closed by a movable housing part 55 hereafter described formed with a small opening through which project only the end of the rotor shaft 49 and its pulley 51. The housing part 55 is preferably dome-shaped or hemispherical, as shown, and secured at its base as by means of screws 56 to the motor ring 34 of frame 33 (Fig. 9) so that this housing part oscillates integrally with the frame 33 and the motor. The annular portion 36 of frame 33 is preferably formed with a substantially hood-shaped portion 57 projecting through an opening 58 in housing part 55 about the rotor shaft end and its pulley 51. The peripheral edge of opening 58 is preferably seated and supported on a step 59 of the frame 33, as shown, the hood-shaped portion 57 constituting in effect an extension of the housing part 55 to partially house the pulley.

A jointed tool arm 60 of known or suitable construction carrying at its outer end a rotary tool 61 is preferably fixed on the movable housing part 55, or more specifically, its extension 57, for which purpose the latter is formed with a socket in which the inner end of the tool arm is fixed as indicated generally at 62, the housing extension 57 and the tool arm extending as shown over and partially around the pulley 51 so as to substantially enclose and protect the same, with a sufficient opening for the driving belt 52. The opening 54 in which housing part 55 oscillates is equipped at its edge with an S-shaped ring 63 (Fig. 4) carrying a sealing ring 64 of rubber, felt or other suitable material for lightly but closely engaging part 55 to maintain a sealed joint between the latter and the stationary top wall 53 of the stand.

Means are preferably provided for counterbalancing the dental engine and controlling its movement about its horizontal axis comprising a spring wire 65 coiled on a bushing on trunnion 38 of frame 33, with one end 66 of the spring engaging arm 29 and the other end engaging a lug 67 (Fig. 9) on frame ring 34. Spring 65 is adjusted to substantially counteract the unbalanced weight of the dental engine, and means are also provided for applying an adjustable friction for lightly retaining it in adjusted position. Such means comprise in the present instance a split collar 68 of suitable material, such as a molded plastic or fiber composition, surrounding trunnion 37 of the frame ring 34. The outer periphery of collar 68 is tapered to correspond with the above described taper of bearing 30 and a nut 69 threaded on trunnion 37 serves to adjustably press the collar against the taper of its bearing to afford a regulated frictional resistance to the turning of trunnion 37 in its bearing 30. A suitable thrust washer 70 is interposed between frame ring 34 and the adjacent surface of arm 28.

It is apparent from the above described construction of the several parts that the dental engine is enclosed and protected substantially entirely within the housing of the stand with only the outer end of the motor shaft and pulley projecting for the connection of the driving belt, these parts being also partially enclosed and protected by the housing extension 57. This compact and self-contained construction is accomplished, moreover, while maintaining universal movement and full flexibility of the dental engine with a minimum of operating parts outside the housing. The operating parts and utilitarian lines of the dental engine are thus housed and blended within the upper end of a stand of domed and pleasing appearance. The invention thus accomplishes its objects, and while it is disclosed herein in the embodiment now preferred, this disclosure is intended to be illustrative rather than limiting, for it is contemplated that various modifications of the same will occur to those skilled in the art, within the scope of the appended claims.

I claim:

1. An equipment stand comprising a housing having an opening at its upper end, a support in said housing having a vertically extending bearing, arm means mounted for oscillation in said support bearing and provided with spaced bearing means, a frame mounted for oscillation in said arm bearing means and provided with supporting means of resilient material, a motor mounted on said supporting means with its rotor shaft arranged at an angle to the axis of said arm bearing means and projecting at one end through said opening, a tool arm associated with said frame, means for counterbalancing said motor, frame and arm, adjustable friction means for controlling the movement of said motor, frame and arm, a pulley on said rotor shaft for driving connection with a rotary tool carried by said arm, and a housing part associated and movable with said frame for housing the same and said motor and closing said opening.

2. In an equipment stand, a stationary housing having side walls and an open top, a motor in said housing adjacent said top thereof, bearing means in said housing supporting said motor for limited universal movement of its rotor shaft, a casing enclosing and movable with said motor, said top opening of the housing being of substantially circular shape and said casing being of substantially hemispherical shape and closing said opening during movement of said motor on said bearing means, said motor having an end of its shaft projecting outwardly through said casing, a tool arm associated and movable with said motor outside said casing, means on said shaft end for driving connection with a tool carried by said arm, and means for counterbalancing the weight of said arm.

3. In an equipment stand, a housing having a stationary part and a movable part, a support in said housing having an upwardly extending bearing, arm means mounted for oscillation in said support bearing and provided with bearing means having an axis arranged at an angle to the axis of said support bearing, a motor mounted for oscillation in said arm bearing means with its rotor shaft arranged at an angle to the axis of said arm bearing means, said movable housing part being associated and movable with said motor, a tool arm outside said movable housing part and associated and movable therewith, means for connecting said rotor shaft through said movable housing part with a rotary tool carried by said arm for driving the same, and resilient means connected with said arm means and said motor for counterbalancing said motor and its associated housing part and tool arm.

4. In an equipment stand, a housing having a stationary part and a movable part, a support in said housing having an upwardly extending bearing, means comprising spaced arms mounted for oscillation in said support bearing and provided with bearings having an axis arranged at an angle to the axis of said support bearing, a motor mounted for oscillation in said bearings with its rotor shaft arranged at an angle to the axis of said arm bearings, said movable housing part being associated and movable with said motor, a tool arm outside said movable housing part and associated and movable therewith, means for connecting said rotor shaft through said movable housing part with a tool carried by said arm to rotate the same, spring means connected with one of said bearing arms and with said motor for counterbalancing the same and its associated housing part and tool arm, and adjustable friction means connecting the other of said bearing arms with said motor for controlling the movement of said motor and associated parts in said arm bearings.

5. An equipment stand, comprising: a stationary housing having a substantially circular opening in a wall thereof, a motor in said housing, means in said stationary housing supporting said motor for limited universal movement thereof relative to said opening, a substantially hemispherical housing fitting said opening in said stationary housing and partially enclosing said motor, said hemispherical housing being fixed with respect to said motor and movable with said motor, an arm fixed for movement with said motor, said arm being adapted to carry a tool, said hemispherical housing having an opening, and means extending through said opening of said hemispherical housing and connecting said motor with said tool for driving the same.

6. An equipment stand, comprising: a stationary housing having a circular opening; a unit including a frame, a motor mounted in said frame, a substantially hemispherical housing secured to said frame and partially enclosing said motor and frame and a tool arm exteriorly of said hemispherical housing and movable with said motor, said hemispherical housing having an opening and said motor having means extending through said opening for driving connection with a tool carried by said arm, said substantially hemispherical housing fitting said opening in said stationary housing; and means in said stationary housing supporting said unit for limited universal movement relative to said opening in said stationary housing.

7. An equipment stand, comprising: a stationary housing having an opening in its upper end, a bracket within said housing provided with a vertical bearing, a fork member mounted for oscillation in said vertical bearing and including spaced arms each provided with a horizontal bearing, a frame disposed between said arms and mounted for oscillation in said horizontal bearings, a motor supported by said frame with its shaft arranged substantially perpendicular to the axis of said horizontal bearings, a substantially hemispherical housing secured to said frame and fitting into said opening in said stationary housing, an arm movable with said motor, said arm being adapted to carry a tool, said hemispherical housing partially enclosing said motor and being provided with an opening, one end of said motor shaft projecting through said last-mentioned opening, and a pulley mounted upon said projecting end of said motor shaft for driving said tool.

8. An equipment stand, comprising: a stationary housing having a circular opening, a motor including a shaft, means in said stationary housing supporting said motor for limited universal movement relative to said opening, a substantially hemispherical housing fitting into said opening and being movable with said motor, said hemispherical housing partially enclosing said motor and being provided with an opening, one end of said motor shaft projecting through said last-mentioned opening, a pulley mounted upon said projecting end of said motor shaft, a hood member movable with said motor partially enclosing said shaft end and pulley, and an arm rigid with said hood member adapted to carry a tool, said pulley providing driving means for said tool.

9. An equipment stand, comprising: a stationary housing having a substantially circular opening in a wall thereof, a motor in said housing including a shaft, means in said stationary housing supporting said motor for limited universal movement thereof relative to said opening, a substantially hemispherical housing fitting said opening in said stationary housing, said hemispherical housing partially enclosing said motor and being fixed with respect to said motor and movable with said motor, said hemispherical housing having an opening, one end of said motor shaft projecting through said last-mentioned opening, a pulley on said projecting end of said motor shaft, a hood member movable with said motor, said hood member projecting through said last-mentioned opening and partially enclosing said shaft end and pulley, and an arm rigidly secured to said hood member, said arm being adapted to carry a tool and said pulley being arranged to drive said tool.

10. An equipment stand, comprising: a stationary housing having an opening in its upper end, a motor in said housing including a shaft, means in said stationary housing supporting said motor for universal movement relative to said opening, said means including a frame and said motor being mounted in said frame, a substantially hemispherical housing secured to said frame and fitting into said opening in said stationary housing, said hemispherical housing partially enclosing said motor and frame and being provided with an opening, said frame including a hood portion extending through said last-mentioned opening, one end of said motor shaft projecting into said hood, a pulley mounted upon said projecting end of said motor shaft, and an arm rigidly secured to said hood adapted to carry a tool, said pulley being arranged to serve as a driving means for said tool.

OSCAR H. PIEPER.